UNITED STATES PATENT OFFICE.

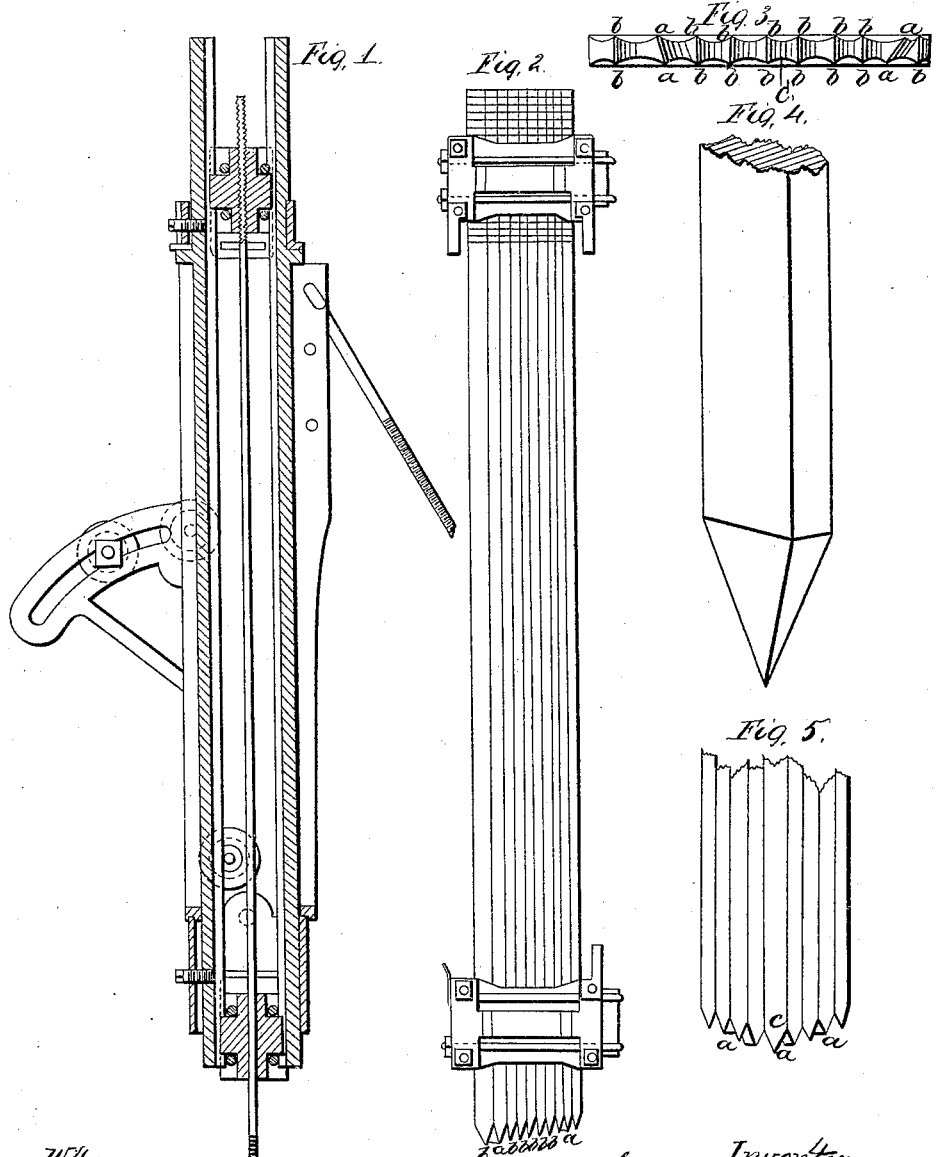

GEORGE J. WARDWELL, OF RUTLAND, VERMONT, ASSIGNOR TO THE STEAM STONE CUTTER COMPANY, OF NEW YORK.

CUTTER FOR STONE-CHANNELING MACHINERY.

Specification forming part of Letters Patent No. 51,273, dated November 28, 1865.

*To all whom it may concern:*

Be it known that I, GEORGE J. WARDWELL, of Rutland, county of Rutland, and State of Vermont, have invented certain new and useful Improvements in Cutters for Stone-Cutting Machinery; and I do hereby declare that the following is a full, clear, and exact description thereof, reference being had to the accompanying drawings, making a part of this specification, in which—

Figure 1 is a vertical transverse section through a gang of cutters applied to their standard-guides. Fig. 2 is a front view of a gang of cutters. Fig. 3 is an enlarged view of the cutting-edges of the cutters when arranged and confined in a gang. Fig. 4 is pyramidal cutter detached from the gang. Fig. 5 represents a gang of cutters arranged for cutting forward or backward without reversing.

Similar letters of reference indicate corresponding parts in the several figures.

This invention relates to certain novel improvements in the construction and arrangement of stepped cutters for machinery which is intended for cutting channels in stone.

It consists in arranging the cutting-edges of a gang of cutting-chisels in such manner that the elevations in the bottom of the channel in the stone which are left by one set of cutting-edges will be chipped off and leveled by another set of cutting-edges in the same gang, thus preventing the cutters from springing apart and becoming injured or broken in the operation of channeling stone, as will be hereinafter described.

It also consists in arranging the cutters in the gang in such manner that the machine to which cutters are applied can operate in going backward as well as forward without the necessity of reversing the cutters, as will be hereinafter described.

It also consists in combining in the same gang a series of transverse cutting-edges with one or more pyramidal cutting-edges, for the purpose of facilitating the operation of cutting the channels in stone and reducing the chips to powder in the center of the channel, as will be hereinafter described.

To enable others skilled in the art to understand my invention, I will describe its construction and operation.

In the stone-cutting machine which was granted to me by Letters Patent dated November 10, 1863, I represented a gang of cutters consisting of a number of flat strips or bars of steel, which were bolted and clamped together edgewise, so that their lower ends were stepped, or arranged one above another. These lower ends were beveled so as to form transverse chisel-edges for cutting and chipping the stone by a rapid tamping which was given to the gang of chisels. One objection to such chisels is that they form elevations upon the stone, and upon striking these elevations or ridges are glanced off, and thus liable to be broken. Another objection to such an arrangement of chisels is that they require to be detached from the stone-cutting machine and reversed at the termini of the channel which is being cut in the stone, if it is desired to have the chisels operate in moving the machine both backward and forward.

In order to remove the first-named objection, two of the cutting-edges, $a\ a$, in the gang of cutters are formed so as to make diagonal cuts across the ridges which are formed in the stone by the transverse cutting-edges $b\ b$. These oblique cutters $a\ a$ are arranged in or nearly in a horizontal plane with the transverse cutting-edges which immediately succeed them, so that these oblique and transverse edges will strike the stone simultaneously. By this arrangement it will be seen that the formation of any considerable elevation on the surface of the stone by the transverse cutters is prevented, as these elevations are reduced by the diagonal cutters. Thus the transverse cutters will always strike upon a surface which is nearly level, and will not be turned aside and broken.

I do not desire to confine my invention to any particular arrangement of the diagonal cutting-edges in the gang with the transverse cutting-edges, but contemplate taking advantage of the combination, however they are arranged.

The second objection above named is removed by arranging the cutting-edges in the stepped form on each side of the central chisel, $c$, as shown in Fig. 5, these edges rising in regular order from the lowest central point. By this arrangement of the cutters in a gang it will be seen that those which are on one side of the central chisel, c, together with this chisel, will cut the stone when the machine is moving in one direction, and those which are on the opposite side of this chisel c will cut the stone when the machine is moving in a contrary direction. Therefore it will not be necessary to remove the gang of chisels from their standard-guides for the purpose of reversing them, as I combine two sets of chisels in one gang for cutting in different directions.

Instead of having the largest cutter c, which strikes the bottom of the channel first, chisel-edged, I prefer to make this cutter pointed by beveling the four sides of the lower end of the bar, so as to form a tapering or pyramidal point, as shown in Fig. 4. Such a point will break up the stone in the center of the channel which is being formed and leave a concavity, which is reduced to a level surface by the succeeding transverse and diagonal cutting-edges. By this means the stone is more rapidly reduced and the cutters work to a much better advantage.

The manner of securing together the stems of the cutters in a gang, and also the manner of arranging these cutters in their standard-guides, is shown in Figs. 1, 2, and fully set forth in my patent of November 10, 1863.

Having thus described my invention, what I claim as new, and desire to secure by Letters Patent, is—

1. The combination of one or more diagonal cutting-edges with transverse cutting-edges formed on the ends of bars which are secured together edgewise, so as to form a gang, substantially as described.

2. The stepped arrangement of the cutters on both sides of a central cutter, substantially as and for the purposes described.

3. The combination of a pyramidal cutter with transverse and diagonal chisels, substantially as described.

GEO. J. WARDWELL.

Witnesses:
W. G. VEAZEY,
BEN K. CHASE.